United States Patent [19]
Hattori

[11] Patent Number: 6,061,208
[45] Date of Patent: May 9, 2000

[54] MAGNETIC DISC DEVICE WITH STOPPER ON CARRIAGE TO LIMIT ROTATIONAL MOVEMENT OF SUPPORT SPRING

[75] Inventor: Toshiro Hattori, Tokyo, Japan

[73] Assignee: NEC Corporation, Tokyo, Japan

[21] Appl. No.: 09/047,445

[22] Filed: Mar. 25, 1998

[30] Foreign Application Priority Data

Mar. 25, 1997 [JP] Japan ................................. 9-071721

[51] Int. Cl.[7] ............................................ G11B 5/55
[52] U.S. Cl. ........................................ 360/106; 360/109
[58] Field of Search .................................. 360/106, 109

[56] References Cited

U.S. PATENT DOCUMENTS

| 5,448,436 | 9/1995 | Albrecht | 360/105 |
| 5,521,778 | 5/1996 | Boutaghou | 360/106 |

FOREIGN PATENT DOCUMENTS

| 2-218075 | 8/1990 | Japan . |
| 2-263369 | 10/1990 | Japan . |
| 4-205864 | 7/1992 | Japan . |
| 4-232678 | 8/1992 | Japan . |
| 7078432 | 3/1995 | Japan . |
| 7-262716 | 10/1995 | Japan . |

OTHER PUBLICATIONS

Fan et al., "Magnetic Recording Head Positioning At Very High TrackDensities Using A Microactuator–Based, Two–Stage Servo System", *IEEE Transactions on Industrial Electronics*, vol. 42(3):222–233, (1995).

Koganezawa et al., "Flexural Piggyback Actuator For Magnetic Disk Drives", pp. 29–30, (1996).

*Primary Examiner*—A. J. Heinz
*Attorney, Agent, or Firm*—Foley & Lardner

[57] ABSTRACT

A head positioning mechanism for a magnetic disc device includes a support spring having one end portion that supports a magnetic head, and the other end portion at which a rotating shaft is disposed. A carriage has one end portion that pivotally supports the rotating shaft of the support spring, and another end portion that is connected to a rotary actuator, to position the magnetic head to a predetermined position on the magnetic disc in cooperation with the carriage and the support spring. A stopper is provided on the carriage, and restricts a rotatable range of the support spring on the carriage. A positioning control at a head precision seek is facilitated as a result.

14 Claims, 7 Drawing Sheets

MAGNETIC DISC DEVICE WITH STOPPER ON CARRIAGE TO LIMIT ROTATIONAL MOVEMENT OF SUPPORT SPRING

BACKGROUND OF THE INVENTION

1. Field of the Invention

The present invention relates to a head positioning mechanism for a magnetic disc device. In particular, the present invention relates to a head positioning mechanism for a magnetic disc device having a fine tracking actuator.

2. Description of the Related Art

A conventional magnetic disc device, as shown in FIG. 13, makes a magnetic head 54 move by a carriage 52 and a support spring 53, which are integrally coupled to a single main actuator 51. However, with a higher track density, an improvement in accuracy of positioning the head has been increasingly demanded. As a means for satisfying the demand, there has been proposed a technique using a fine tracking actuator for moving the respective magnetic heads by a very short distance in addition to the main actuator.

For example, Japanese Patent Unexamined Publication No. Hei 2-263369 and Japanese Patent Unexamined Publication No. Hei 4-232678 disclose a device using a fine displacement generating element as a fine tracking actuator. In this conventional example, in the case of conducting a head coarse seek operation that allows the main actuator to be moved, the rigidity of the element per se prevents the support spring from greatly fluctuating, resulting in an advantage that control is facilitated. In this conventional example, during the head coarse seek operation, the operation of the fine displacement generating element is stopped, and the main actuator is driven. On the other hand, after the completion of the head coarse seek operation, the main actuator is stopped, and a head fine seek operation is conducted. In other words, the fine displacement generating element is driven on the basis of a position error signal from the magnetic head to realize a fine head positioning operation.

Also, in a lecture report of Japan Machinery Association, IIP'96 (Information, Intelligence, and Precision Machine Section), "A high-compliance type fine tracking actuator of a magnetic disc device," a fine tracking actuator employing an electromagnetic force shown in FIG. 14 has been announced.

However, in the former conventional example using the fine displacement generating element, since a high voltage is required to drive the fine displacement generating element, and a long-period reliability of the element per se is low, etc., there is such a disadvantage that the utility is low. Also, in the latter conventional example using the electromagnetic force, because the fine tracking actuator is not perfectly fixed to a carriage during the head coarse seek operation that makes the main actuator move, a relative positional relationship between the carriage and the support spring is not determined by only one variable at the time of starting the head fine seek operation that makes the fine tracking actuator and the main actuator operate simultaneously. This results in a disadvantage that the control of the fine tracking actuator becomes difficult.

SUMMARY OF THE INVENTION

In view of the above, an object of the present invention is to provide a head positioning mechanism for a magnetic disc device that facilitates and ensures the positioning control during the head fine seek operation particularly in the latter case, that is, in the fine tracking actuator using the electromagnetic force.

In order to achieve the above object, according to the present invention, a head positioning mechanism for a magnetic disc device comprises a support spring having one end portion that supports a magnetic head and the other end portion at which a rotating shaft is disposed; and a carriage having one end portion that pivotally supports the rotating shaft of the support spring and the other end portion which is connected to a rotary actuator, to position the magnetic disc to a predetermined position on the magnetic disc in cooperation with the carriage and the support spring. The mechanism is also provided with a stopper that restricts a rotatable range of the support spring at the carriage.

In the present invention, for example, since there is no case in which the support spring exceeds a predetermined rotatable range due to the inertia of the rotating carriage, the control of rotation of the support spring after the operation of the carriage can be relatively facilitated.

According to the present invention, the support spring is rotated so that a part of the support spring is abutted against the stopper so as to be fixed before the track access operation due to the drive of the carriage is conducted.

In the present invention, since the relative position of the support spring with respect to the carriage at the time of completion of the carriage rotating operation for track access is always kept constant, the control of rotation of the support spring after the completion of the carriage rotating operation is facilitated.

According to the present invention, when track moving operation is conducted, the support spring is first directed to a track side to which the magnetic head is to be moved so that it is abutted against the stopper and then fixed thereto, and in this state, after the magnetic head is positioned to the track to which the magnetic head is to be moved due to the drive of the carriage, the magnetic head is directed along a track direction in cooperation with the support spring and the carriage while reading data.

In the present invention, since the magnetic head is moved from the current track to a destination track in the shortest period of time to start read operation of data in addition to the above-described operation of the present invention, a high-speed access operation can be realized.

With the apparatus as described herein, it is intended to attain the object of the present invention described above.

BRIEF DESCRIPTION OF THE DRAWINGS

The above-mentioned objects and advantages of the invention will become more apparent from the following detailed description when read in conjunction with the accompanying drawings, with like reference numerals indicating corresponding parts throughout, and wherein.

DETAILED DESCRIPTION OF THE PREFERRED EMBODIMENT

Hereinafter, an embodiment of the present invention will be described with reference to the accompanying drawings.

Figure 1:
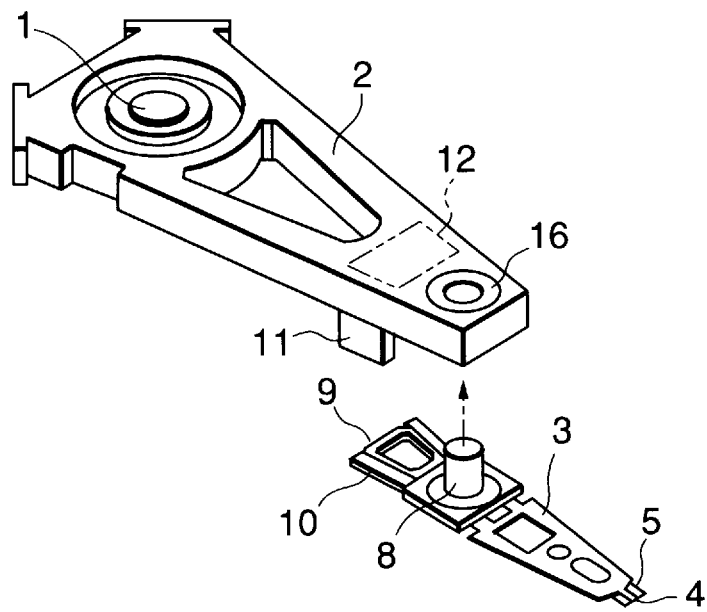
FIG. 1 is an exploded perspective view showing an embodiment mode of the present invention.
Figure 3:
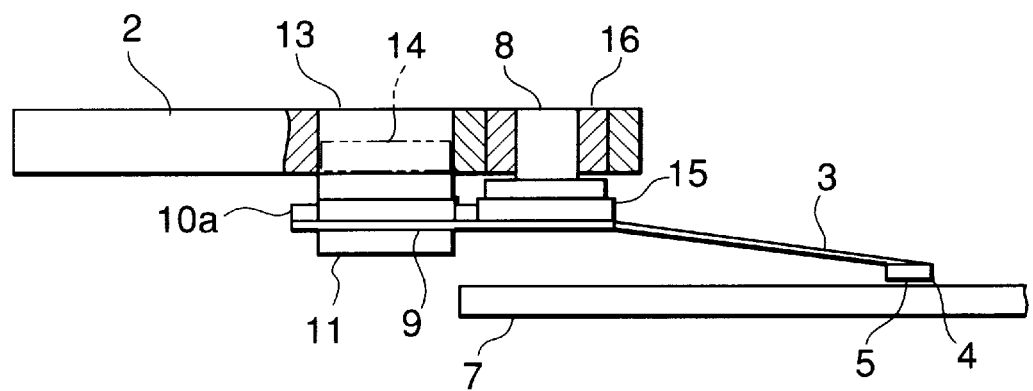
FIG. 3 is a structural diagram with a partially cross section showing a coupling state of a carriage and a support spring shown in FIG. 1.

In FIG. 1, a bearing 16 is disposed at a tip of a carriage 2, and a rotating shaft 8 of a support spring 3 penetrates therethrough in such a manner that the carriage 2 is coupled to the support spring 3. A coil 9 is disposed on a surface of the support spring 3 that is opposed to the carriage 2, and a yoke 13 and a magnet 14 are disposed on a surface of the carriage which is opposed to the coil 9, as shown in FIG. 3. The magnet 14, the yoke 13, the coil 9 and a coil support 10 that acts as a movable yoke constitute a fine tracking actuator that actuates as a VCM (voice coil motor), thereby rotating the support spring 3.

In this example, a movable range of the fine tracking actuator, that is, a rotating range of the support spring 3, is restricted by a coil support arm 10a and a stopper 11 that projects from the carriage 2.

In the above structure, access operation to the magnetic disc is conducted as stated below.

(1) Upon outputting an access start command, the fine track actuator is driven so that the support spring is rotated in a direction toward which the magnetic head is preceding, and the coil support arm 10a of the fine tracking actuator is pressed toward the stopper 11 (FIGS. 5 to 8). In this situation, in the case where the magnetic head has reached a target track before the support spring reaches the stopper, operation is shifted to operation (3) which will be described later.

(2) While the support arm boa of the fine tracking actuator is pressed toward the stopper 11 of the carriage 2, the movement of the carriage 2 due to the main actuator 1 is started.

(3) After the magnetic head reaches the target track, the carriage is moved by the main actuator until a head output becomes maximum, and simultaneously the support spring is driven by the fine track actuator so that the magnetic head is allowed to follow the target track. In other words, the direction of the magnetic head is put along a track direction.

Figure 2:
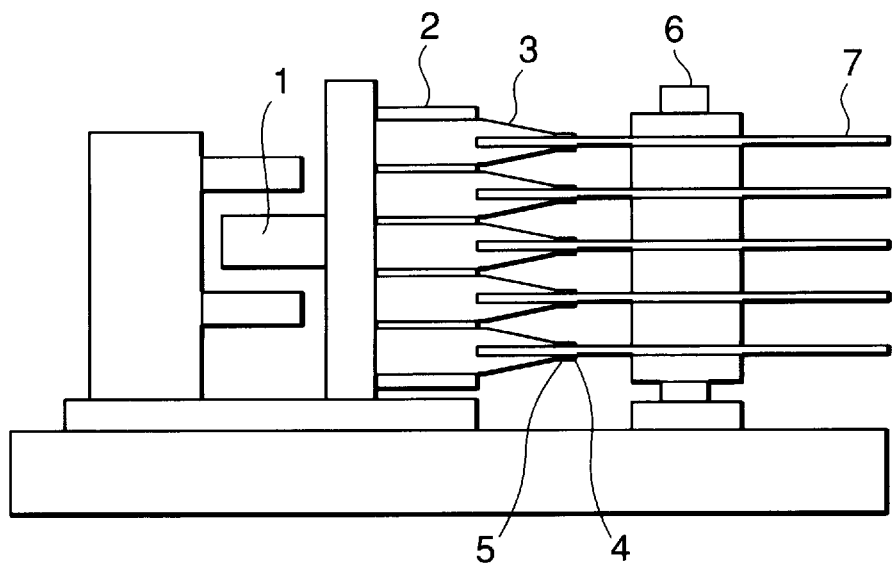
FIG. 2 is a structural diagram showing a magnetic disc device to which an embodiment of the present invention is applied.

The embodiment described herein is based on the assumption that there exist a plurality of discs and magnetic heads. However, the present invention is also applicable to a single disc and magnetic head. As shown in FIG. 2, a plurality of discs 7 are rotated by a spindle 6, and data is read or written from both surfaces of the discs 7 by a plurality of magnetic heads 4. Each of the magnetic heads 4 is attached to a slider 5 that operates to float the magnetic head 4. The slider 5 is supported by the support spring 3 that is pivotally supported by the carriage 2 to be coupled thereto.

In more detail, in FIG. 1, one end portion of the carriage 2 is supported by the rotary type main actuator 1, and the other end portion of the carriage 2 is provided with a rotating shaft frame 16. The rotating shaft 8 of the support spring 3 is inserted into the rotating shaft frame 16 in a coupling manner. A magnetic circuit 12 is disposed on the carriage in the vicinity of the rotating shaft frame 16. The magnetic circuit 12 is equipped with a magnet 14 on an opposite side of the support spring 3, as shown in FIG. 3, and the yoke 13 is disposed adjacent to the magnet 14 on an opposite side of the support spring 3 with respect to the magnet 14. The magnet 14 is provided with an arcuate (curved) shape so as to maintain a constant magnetic attraction with respect to the coil 9 irrespective as to the position of the support spring with respect to the carriage 2.

Figure 4:
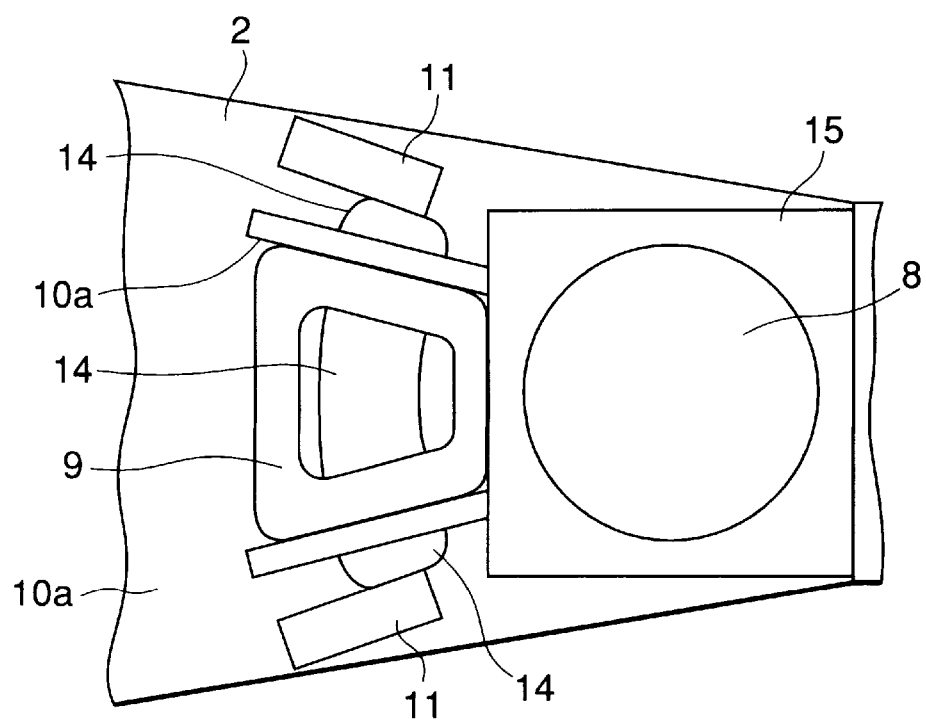
FIG. 4 is a main structural diagram showing the embodiment of the present invention.

As is apparent from FIG. 4 showing the carriage surface viewed from the support spring 3 side, the magnet 14 is formed so that it is nearly arc-shaped with a predetermined width with the rotating fulcrum of the support spring 3 as a center, and the length of the arc determines a movable range of the support spring 3. Also, the stoppers 11 are projected from the carriage surface toward the support spring 3 on both ends of the magnet 14. The stoppers 11 are disposed on the carriage in the form of a reverse V substantially toward the rotating shaft of the support spring 3.

On the other hand, the support spring 3 is designed as shown in FIG. 1 in such a manner that the magnetic head 4 is supported by one end portion of the support spring 3, and the doughnut-shaped coil 9 is fixed to the other end portion of the support spring 3 substantially in parallel with the carriage surface. The coil 9 is held between a pair of coil support arms 10a from both sides thereof as shown in FIG. 4. The coil support arms 10a are disposed in the form of a reverse V toward the rotating shaft 8 of the support spring 3 similar to the above-mentioned stoppers 11 on the carriage side. In this example, a width between the coil support arms 10a is set to be narrower than a width between the stoppers 11 on the carriage 10 side. The above-mentioned rotating shaft 8 is projected toward the carriage direction in the vicinity of the coil 9 in such a manner that it is pivotally supported by the rotating shaft frame 16 of the carriage 2, as shown in FIG. 3. In this situation, as shown in FIG. 4, the coil support arms 10a are disposed between the stoppers 11, and coil 9 is opposed to the magnet 14. In this example, the receiving surface of the coil 9 functions as a movable yoke.

Then, with control of a current that flows in the coil 9, the coil 9 receives a force in relation to a magnetic flux developed by the magnet 14 so that the support spring 3 rotates between the stoppers 11. The movable range of the support spring 3 is restricted by the stoppers 11, and the movable range is designed on the basis of the relative position of the carriage 2 and the support spring 3 at the respective times when the magnetic head 4 follows the innermost peripheral track of the magnetic disc and when it follows the outermost peripheral track thereof. In particular, the movable range is designed so that the carriage 2 and the support spring 3 can read the outermost peripheral track when positioned along an ideal track reading position, and so that the carriage 2 and the support spring 3 can read the innermost peripheral track when also positioned in the ideal track reading position. The ideal track reading position is when a major axis of the support spring 3 is perpendicular to a radial direction of the tracks on a disk being read.

In setting the movable range, when the movable range is narrowed, the relative angle between the carriage 2 and the support spring 3 is restricted in the innermost peripheral track or the outermost peripheral track. However, an excellent floating characteristic of the magnetic head can achieved. On the other hand, when the movable range is widened, because the magnetic head can reach the target track by only drive of the fine tracking actuator if operation is at the time of the short-distance seek, the short-distance seek operation can be increased in speed. However, because the relative angle of the slider 5 with respect to the track increases when the coil support arms 10a are pressed toward the stoppers 11, there is a case in which the floating characteristic of the magnetic head is not as good as the other case. As a result, the above situations must be considered when setting the movable range.

Operation of this embodiment will be described hereinbelow.

First, the track position following operation will be described. The track position following operation mainly means that the fine tracking actuator is driven so that the magnetic head is allowed to follow a center of the target track. In this operation, if the relative position between the carriage and the support spring cannot be detected, there is the possibility that the magnetic head follows the track at the movable limit position of the fine tracking actuator depending on an angle of the main actuator. In this case, because the fine tracking actuator is moved toward only one direction, this causes a factor of deteriorating the position following characteristic. For that reason, the relative position between the carriage and the support spring is detected, and the relative position need be set to a desired angle.

Therefore, in this embodiment, taking into consideration the fact that the relative angle between the carriage and the support spring corresponds to the relative angle between the slider and the track on the disc surface on a one-to-one basis for each track, the relative angle between the carriage and the support spring is judged in accordance with an output of the magnetic head that reflects the relative angle between the slider and the track on the disc surface.

For example, an output of the magnetic head is monitored in a signal region having a maximum amplitude as in an AGC (auto gain control) region, and the fine tracking actuator and the main actuator are cooperated (operated simultaneously) so that an output value of the head becomes maximum, to thereby set the relative angle between the carriage and the support spring. As a result, the minimum movable range of the fine tracking actuator is also decided.

Figure 5:
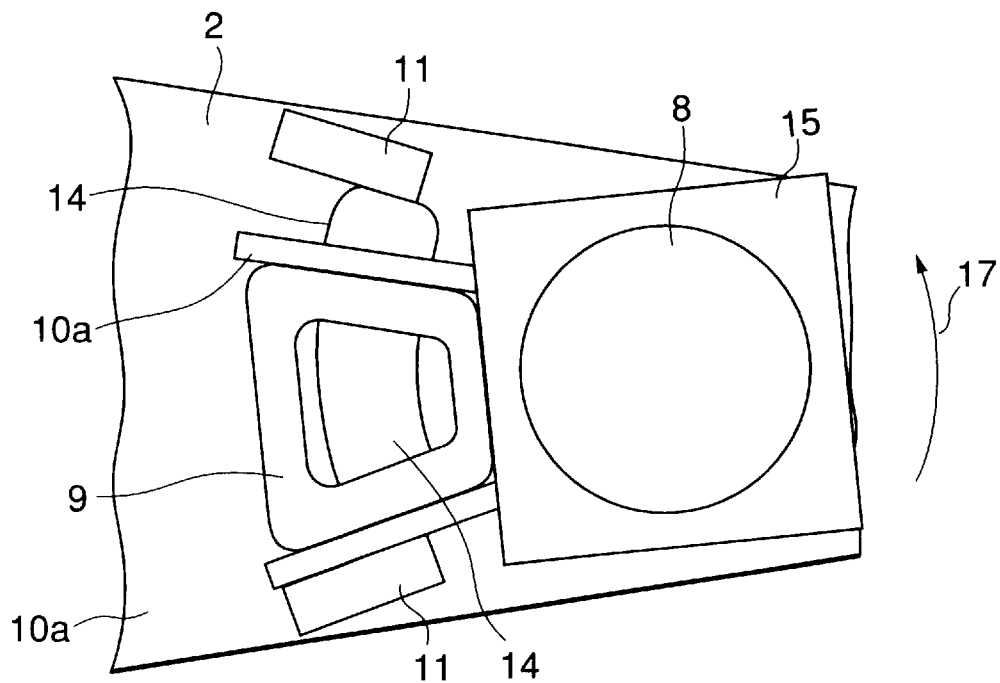
FIG. 5 is a diagram for explanation of the operation of the embodiment shown in FIG. 4.
Figure 6:
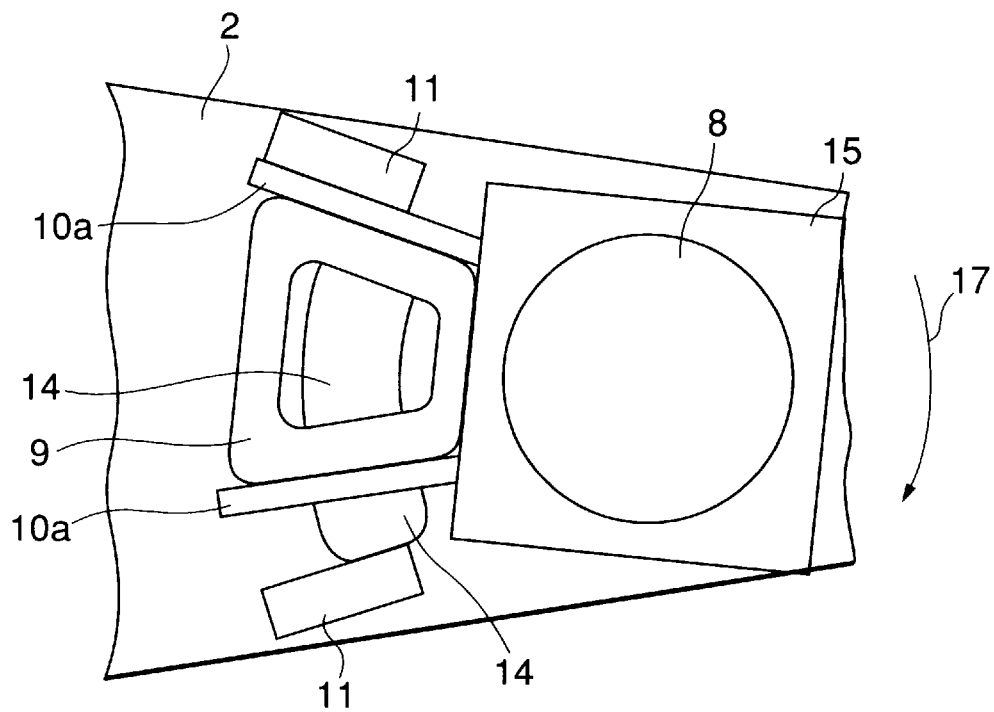
FIG. 6 is a diagram for explanation of the operation of the embodiment shown in FIG. 4.
Figure 7:
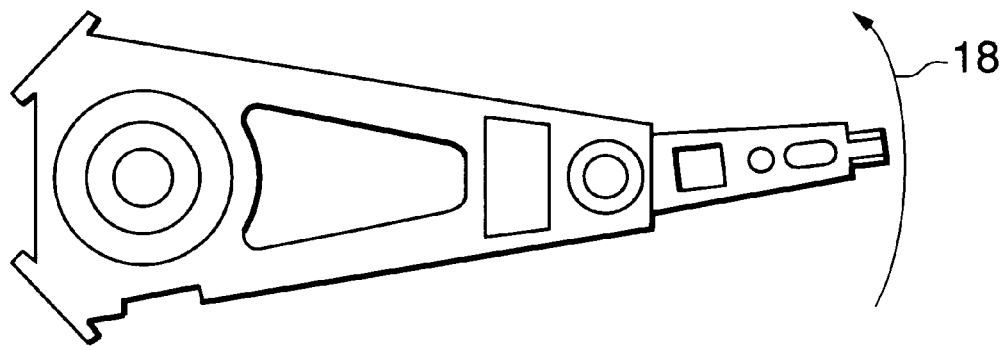
FIG. 7 is a diagram for explanation of the operation state of a support spring.
Figure 8:
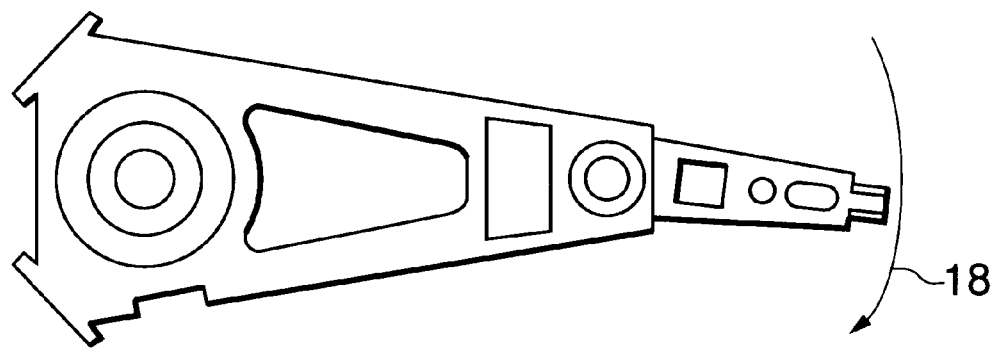
FIG. 8 is a diagram for explanation of the operation state of a support spring.
Figure 9:
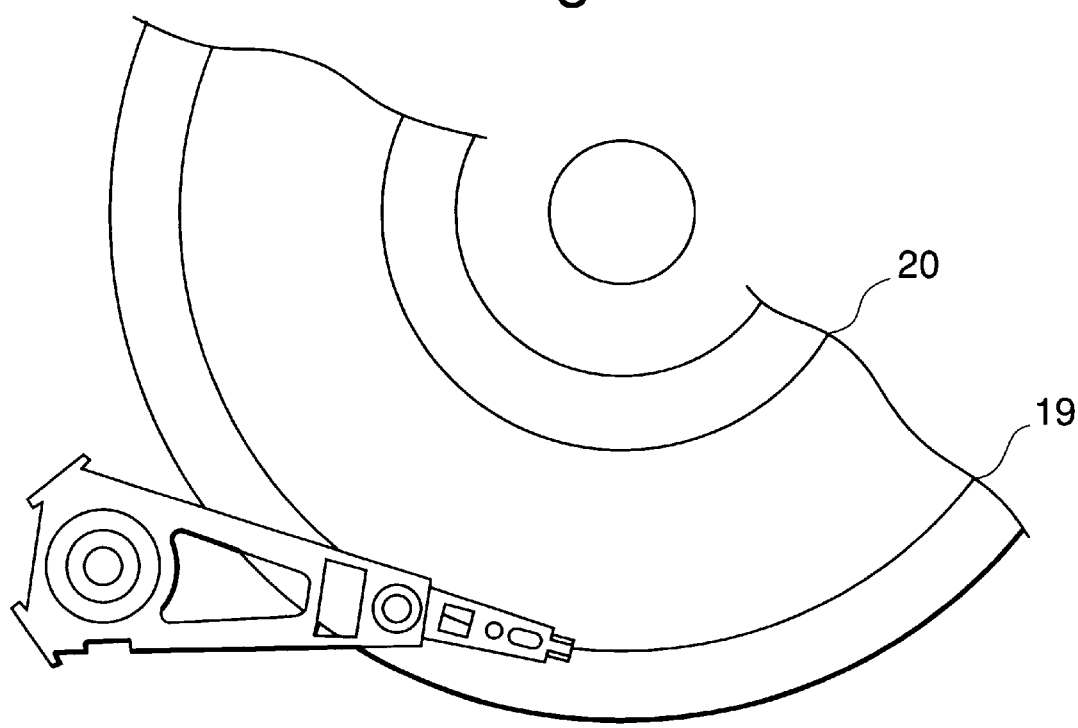
FIG. 9 is a diagram for explanation of the track moving operation, which shows a state of following to the current track.
Figure 10:
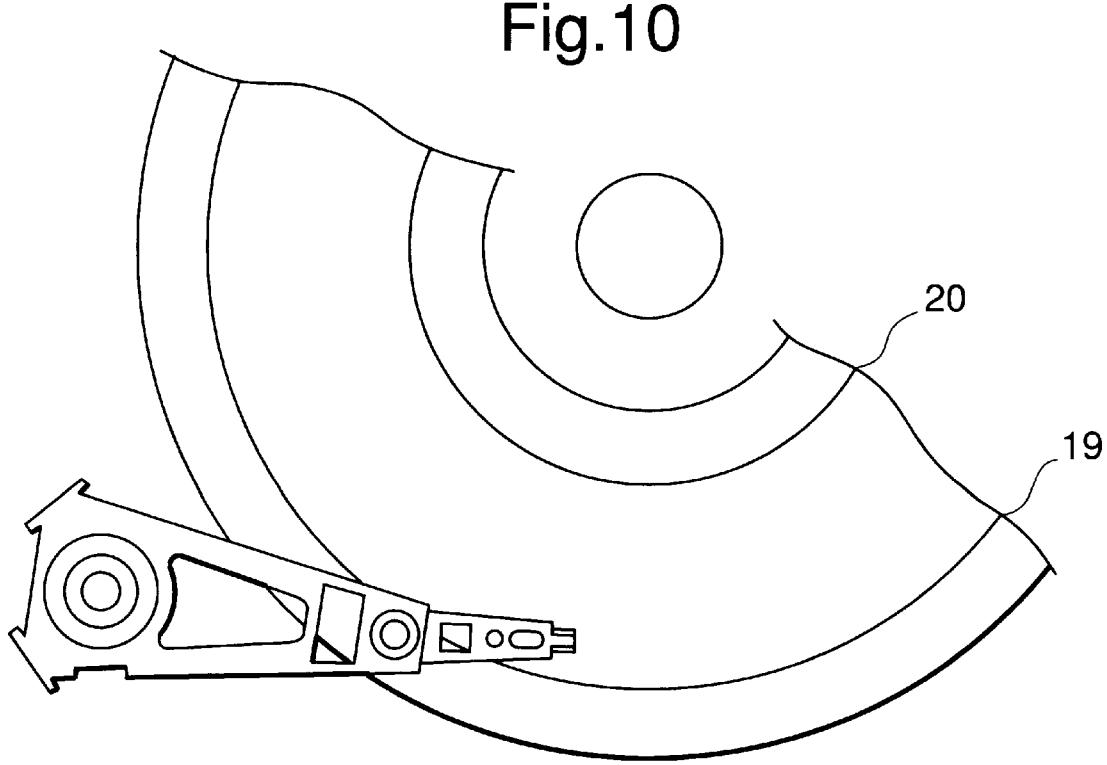
FIG. 10 is a diagram for explanation of the track moving operation, which shows a state of directing the support spring toward the track side to which the magnetic track is moved.
Figure 11:
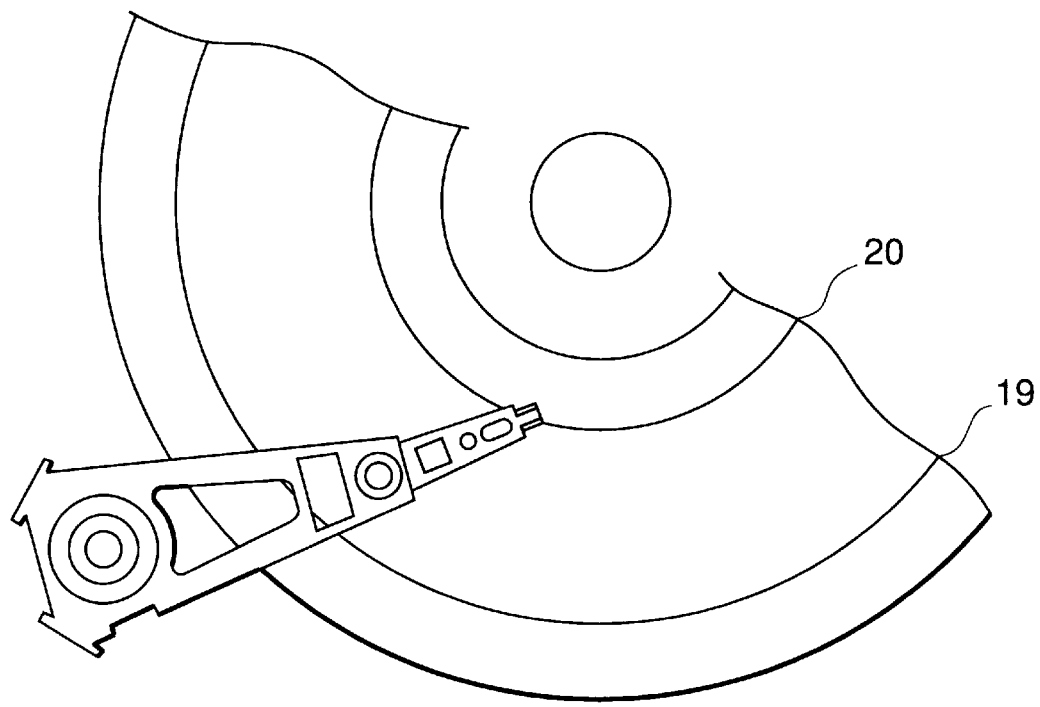
FIG. 11 is a diagram for explanation of the track moving operation, which shows a state of driving the carriage so that the magnetic head is positioned to the track to which the magnetic head is moved.

Subsequently, the access operation will be described. As shown in FIG. 9, as a result of the above-mentioned track position following operation, in a state where the magnetic head 4 follows a certain track 19, when the access start command is inputted, a predetermined drive current is inputted to the coil 9, and the coil support arms 10a are pressed toward the stoppers 11 as shown in FIG. 5 or 6. As a result, the support spring 3 rotates as shown in FIG. 10 from a state shown in FIG. 9, and the magnetic head 4 precedes in a direction of a track 20 to be accessed succeedingly. From this state, the main actuator is driven so that the carriage rotates up to a position shown in FIG. 11.

Figure 12:
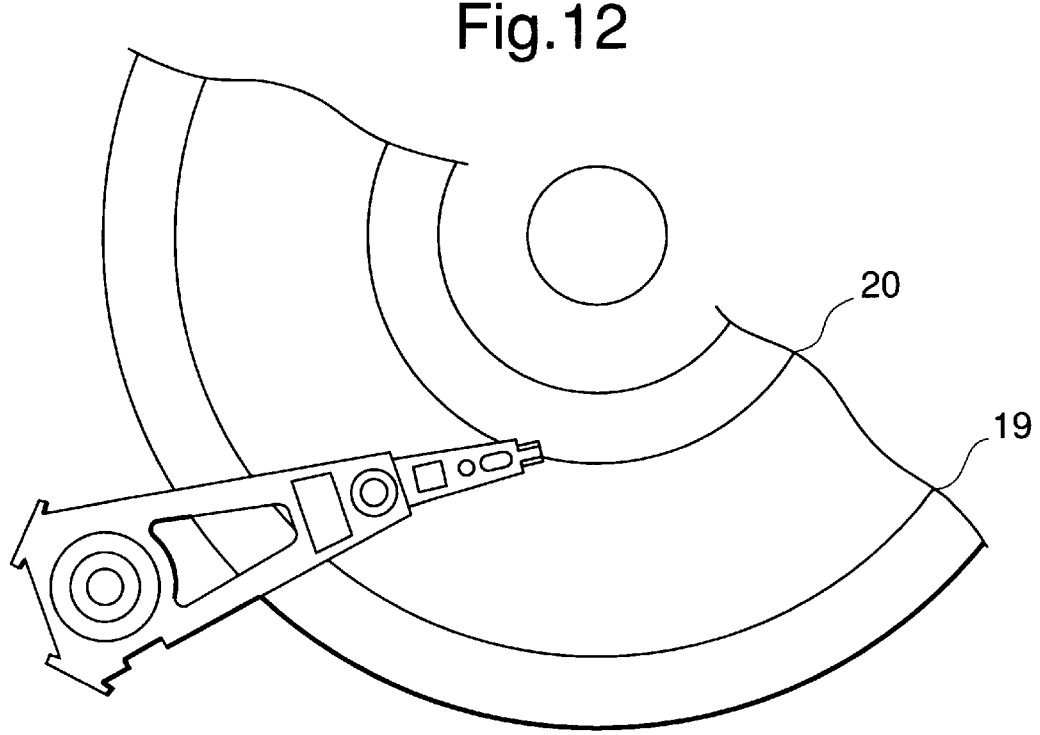
FIG. 12 is a diagram for explanation of the track moving operation, which shows a state of putting the magnetic head along the track direction in cooperation with the carriage and the support spring.
Figure 13:
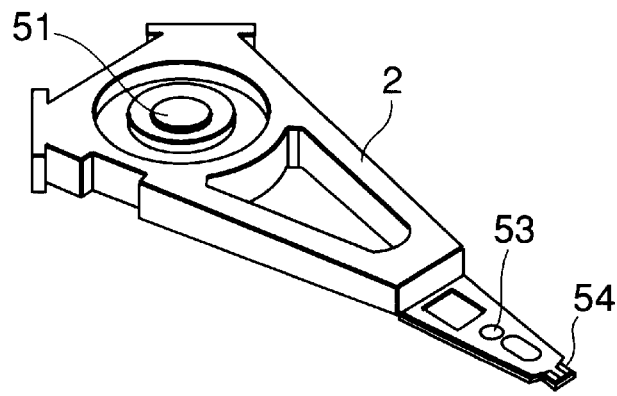
FIG. 13 is a perspective view showing an embodiment of a conventional structure from which its part is omitted.
Figure 14:
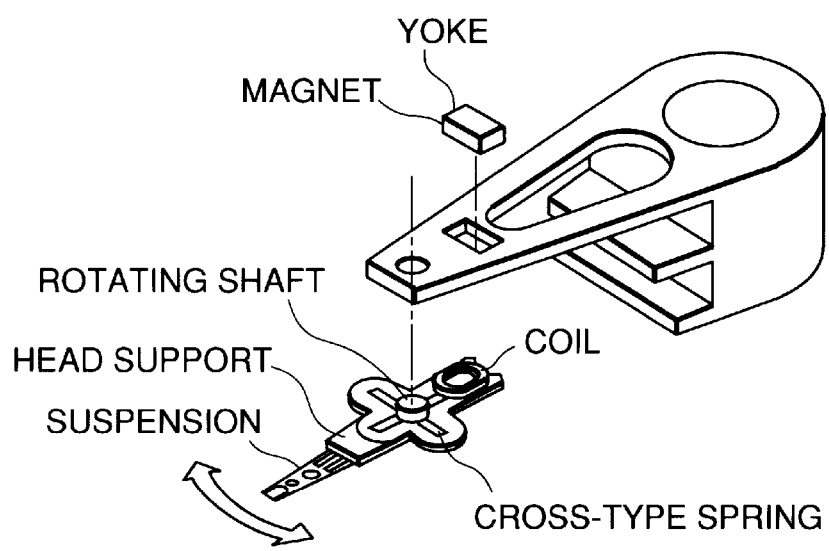
FIG. 14 is an exploded perspective view showing the embodiment of the conventional structure.

However, during the access operation, a current of a given value is allowed to continuously flow in the coil 9, whereby the support spring 3 is fixed to the stopper 11 of the carriage 2. In this situation, if there comes to the state shown in FIG. 11, data can be read. From that state, the above-mentioned track position following operation is further executed, and the fine tracking actuator is cooperated so that while read of data is conducted, the settling operation of the main actuator is conducted. Through the above operation, the magnetic head 4 is moved to the target track 20 as shown in FIG. 12.

As described above, in this embodiment, there are provided stoppers that determine the rotatable range of the support spring, and during the track access operation, the support spring is first directed toward the target track side so as to be locked by the stoppers, and in this state, after the magnetic head is positioned to the target track by drive of the carriage, the direction of the magnetic head is put along the track direction in cooperation with the support spring and the carriage while reading data. As a result, the access control that allows the support spring 3 to be stabilized can be realized, and the access time can be shortened.

Alternatively, the magnet may be equipped in the support spring, and the coil may be equipped in the carriage. Also, the fixing of the support spring may be realized by a magnetic force of a magnet attached to the support spring or the stoppers.

Since the present invention is structured and functions as described above, the effect according to the present invention is that since the carriage is provided with the stoppers that restrict the rotatable range of the support spring, there can be prevented the event that the support spring exceeds the predetermined rotatable range due to the inertia of the rotating carriage, and the control of rotation of the support spring after the operation of the carriage can be relatively facilitated.

In the present invention, since the support spring is rotated in such a manner that a part of the support spring is abutted against the stoppers and fixed thereto before the track access operation due to the drive of the carriage is conducted, the relative position of the support spring with respect to the carriage is always held constant at the time of completion of the carriage rotating operation for track access, so that the control of rotation of the support spring after that state can be readily conducted.

In the present invention, the support spring is directed toward the track side to which the magnetic head is to be moved so that it is abutted against the stoppers and fixed thereto. In this state, after the magnetic head is positioned to the track to which the magnetic head is to be moved due to drive of the carriage, the direction of the magnetic head is put along the track direction in cooperation with the support spring and the carriage while reading data. As a result, the magnetic head is moved from the current track to the destination track in the shortest period, and read of data is started. Therefore, there can be provided the head positioning mechanism for the magnetic disc device and its drive control method which can realize a high-speed access operation.

While a preferred embodiment has been described herein, modification of the described embodiment may become apparent to those of ordinary skill in the art, following the teachings of the invention, without departing from the scope of the invention as set forth in the appended claims.

What is claimed is:

1. A head positioning mechanism for a magnetic disc device, comprising:

a support spring having one end portion that supports a magnetic head and the other end portion at which a rotating shaft is disposed;

a carriage having one end portion that pivotally supports the rotating shaft of the support spring and the other end portion which is connected to a rotary actuator, to position the magnetic head to a predetermined position on the magnetic disc device in cooperation with the carriage and the support spring, the carriage having a top surface and a bottom surface; and a stopper extending downwardly from the bottom surface of the carriage, the stopper configured to restrict a rotatable range of the support spring.

2. A head positioning mechanism as claimed in claim 1, wherein the support spring is rotated in one direction via the rotating shaft so that an outer edge of the support spring abuts against the stopper so as to disable further rotation in the one direction before a track access operation of the magnetic disc device is conducted.

3. A head positioning mechanism as claimed in claim 1, wherein, when a track moving operation is conducted, the support spring is first rotated in a first direction to be directed a track side to which the magnetic head is to be moved so that the support spring abuts against the stopper which stops any further rotation of the support spring in the first direction, and with the support spring abutted against the stopper, after the magnetic head is positioned to the track to which the magnetic head is to be moved, the magnetic head is directed along a track direction in cooperation with the support spring and the carriage so as to read data from the magnetic disc device.

4. A head positioning mechanism as claimed in claim 1, further comprising a magnet disposed on the carriage adjacent to the stopper, wherein the magnet has an arcuate shape.

5. A head positioning mechanism as claimed in claim 1, further comprising:

a second stopper provided on the carriage, the stopper configured to restrict a rotatable range of the support spring to a first position, the second stopper configured to restrict the rotatable range of the support spring to a second position; and a pair of support arms provided on the support spring and configured to respectively abut against a corresponding one of the stopper and the second stopper so as to restrict the rotatable range of the support spring.

6. A head positioning mechanism as claimed in claim 1, wherein the stopper extends downwardly in a plane perpendicular with respect to a plane the corresponds to the bottom surface of the carriage.

7. A method of positioning a magnetic head for reading information on a magnetic disc device, the magnetic head including a support spring attached to and being in contact with at least a portion of a bottom surface of a carriage, the method comprising the steps of:

a) restricting a rotatable position of the support spring to a first rotational position and a second rotational position by use of a first stopper and a second stopper that extend from the bottom surface of the carriage to be disposed at opposite sides with respect to the stopper, the first rotational position corresponding to the support spring pointing away from a track direction for reading information on the magnetic disc device, the second rotational position corresponding to the support spring pointing towards the track direction on the magnetic disc device;

b) rotating the support spring so that the support spring is positioned between the first stopper and the second stopper, so as to read information on a particular track of the magnetic disc device;

c) performing a track moving operation from the particular track to a next track by performing the following substeps:

c1) rotating the support spring so that the support spring abuts against the first stopper, so that the support spring is pointed in a direction as close as possible towards the next track;

c2) moving the carriage to the next track while maintaining the support spring abutted against the first stopper; and c3) reading information from the next track.

8. A head positioning method as claimed in claim 7, further comprising the step of:

d) rotating the support spring to a position between the first and second stoppers, inclusive, to read the information from the next track, wherein the rotating in the step d) is performed to position the support spring in a substantially central position in the next track.

9. A method of positioning a magnetic head for reading information on a magnetic disc device, the magnetic head including a support spring attached to a carriage, the support spring having one end portion that supports a magnetic head for reading the information on the magnetic disc device, the method comprising the steps of:

a) rotating the carriage in preparation to read at least one particular track on the magnetic disc device;

b) positioning the support spring between two stoppers that extend downwardly with respect to a bottom surface of the carriage to read the at least one particular track the support spring being in contact with at least a portion of the bottom surface of the carriage;

c) after reading the at least one particular track, determining where a next track to be read is located with respect to the at least one particular track that has been read;

d) moving the support spring to abut against one of the two stoppers that is closest to the next track; and e) rotating the carriage to the next track.

10. A head positioning method as claimed in claim 9, wherein the support spring is maintained abutted against the one of the two stoppers while the carriage is rotated in the step e).

11. A head positioning method as claimed in claim 9, wherein the support spring is moved while the carriage is not rotated during the step d).

12. A head positioning method as claimed in claim 9, wherein the support spring has a second end portion that is rotatably connected to the carriage.

13. A head positioning method as claimed in claim 12, wherein the support spring is rotated about the carriage due to the rotatable connection of the support spring to the carriage during the step d).

14. A head positioning method as claimed in claim 9, wherein the step a) corresponds to a coarse positioning step, and wherein the step b) corresponds to a fine positioning step.

* * * * *